US005943921A

United States Patent [19]

Lin

[11] Patent Number: 5,943,921

[45] Date of Patent: Aug. 31, 1999

[54] REVERSIBLE SCREWDRIVER WITH ANGLE AND LENGTH ADJUSTABLE DRIVING SHAFT

[75] Inventor: Ching-Chou Lin, Taichung Hsien, Taiwan

[73] Assignee: Shou King Enterprise Co., Ltd., Taichung Hsien, Taiwan

[21] Appl. No.: 09/002,078

[22] Filed: Dec. 31, 1997

[51] Int. Cl.[6] .......................... B25B 13/00; B25B 23/16; F16D 3/34

[52] U.S. Cl. ......................... 81/59.1; 81/177.8; 81/177.7; 192/44

[58] Field of Search ................................ 81/59.1, 177.7, 81/177.8; 192/44

[56] References Cited

U.S. PATENT DOCUMENTS 2,182,673 12/1939 Magnano ............................... 81/177.7

5,515,754 5/1996 Elkins .................................... 81/177.9

5,632,186 5/1997 Lin ........................................... 81/59.1

5,829,325 11/1998 Tseng ...................................... 81/59.1

*Primary Examiner*—David A. Scherbel

*Assistant Examiner*—Philip J. Hoffmann

*Attorney, Agent, or Firm*—Bacon & Thomas, PLLC

[57] ABSTRACT

A hand tool which includes a handle holding a sleeve on the inside, a shaft moved in and out of the sleeve, a coupling member pivoted to the shaft and turned between a first position where the coupling member and the shaft are axially aligned, and a second position where the coupling member and the shaft are retained at right angles, and a control device coupled to the coupling member and shifted between a first position for forward/backward driving, a second position for forward driving only, and a third position for backward driving only.

1 Claim, 6 Drawing Sheets

REVERSIBLE SCREWDRIVER WITH ANGLE AND LENGTH ADJUSTABLE DRIVING SHAFT

BACKGROUND OF THE INVENTION

The present invention relates to hand tools, and more particularly to such a hand tool which can be set in any of a variety of operating modes for turning the workpiece efficiently.

A regular hand tool is generally comprised of a handle, a tool stem connected to the handle and adapted for holding any of a variety of tool bits. Because the tool stem is fixedly connected to the handle, it is synchronously turned with the handle when the handle is turned with hand forwards or backwards. There is known a reversible hand tool which comprises ratchet means coupled between the handle and the tool stem, for permitting the tool stem to be turned with the handle in one direction only. However, because the tool stem is axially extended from the handle, much effort should be applied to the handle when turning the handle with the hand.

SUMMARY OF THE INVENTION

It is the main object of the present invention to provide a hand tool which can be adjusted to change its length or the angle of its handle for turning the workpiece efficiently. According to the present invention, the hand tool comprises a handle holding a sleeve on the inside, a shaft moved in and out of the sleeve, a coupling member pivoted to the shaft and turned between a first position where the coupling member and the shaft are axially aligned, and a second position where the coupling member and the shaft are retained at right angles, and a control device coupled to the coupling member and shifted between a first position for forward/backward driving, a second position for forward driving only, and a third position for backward driving only.

DETAILED DESCRIPTION OF THE PREFERRED EMBODIMENT

Figure 1:
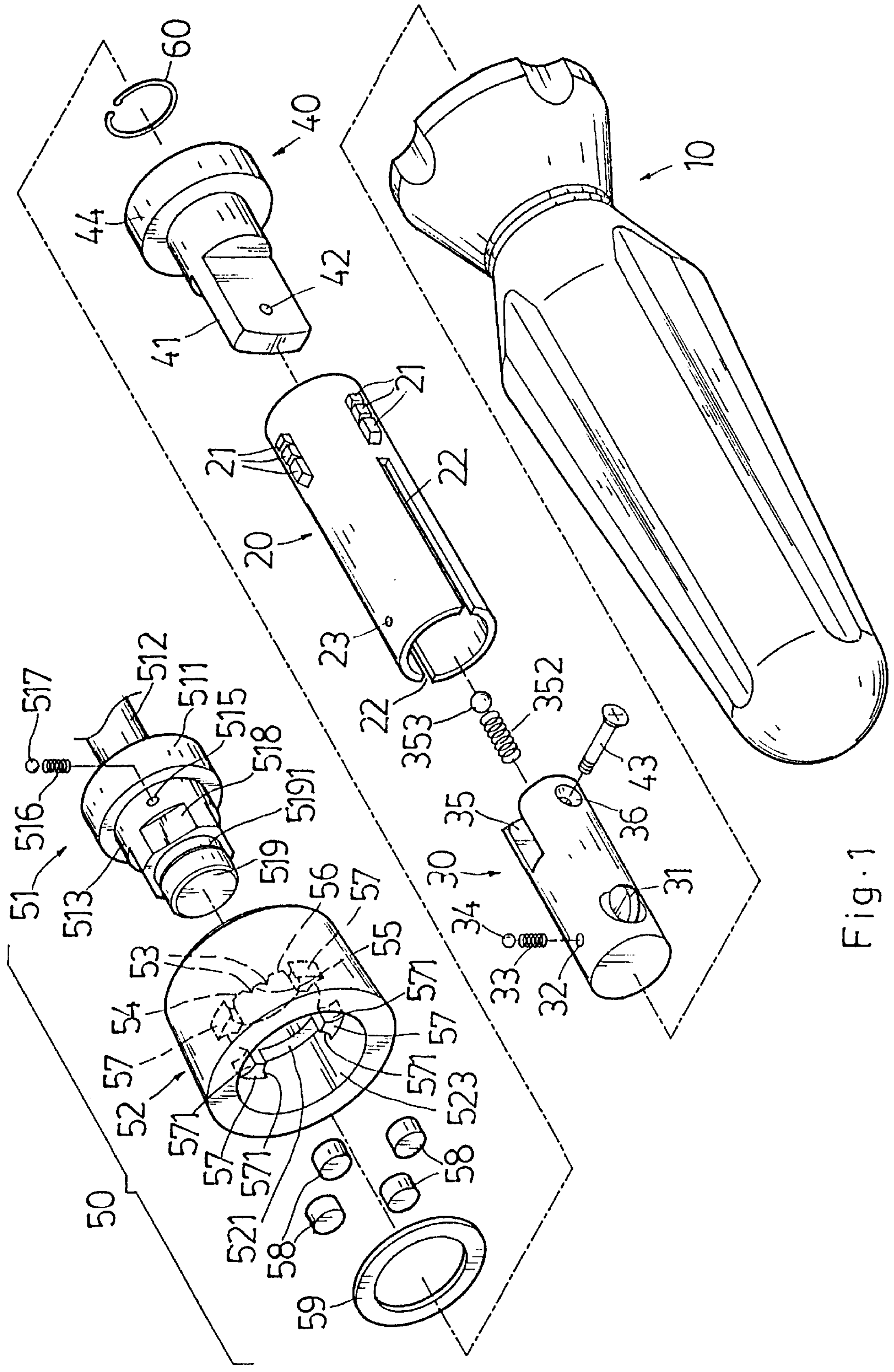
FIG. 1 is an exploded view of a hand tool according to the present invention.

Referring to FIGS. from 1 to 5, a hand tool in accordance with the present invention is generally comprised of a handle 10, a sleeve 20, a shaft 30, a coupling member 40, and a control device 50.

The handle 10 comprises an axial receiving chamber 11 extended to its one end, and a plurality of recessed retaining holes 12 inside the axial receiving chamber 11.

The sleeve 20 fits the axial receiving chamber 11 of the handle 10, comprising a plurality of beveled retainer blocks 21 raised from the periphery near its front end which are respectively forced into engagement with the recessed retaining holes 12 when the sleeve 20 is plugged into the axial receiving chamber 11, two longitudinal splits 22 bilaterally extended to its rear end, and a radial locating hole 23 near its rear end between the longitudinal splits 22.

The shaft 30 is inserted into the sleeve 20, comprising two wings 31 bilaterally raised from the periphery near its rear end and moved with the shaft 30 along the longitudinal splits 22 on the sleeve 20, a radial blind hole 32 spaced between the wings 31, a first spring 33 mounted in the radial blind hole 32, a first steel ball 34 supported on the first spring 33 and adapted for engaging into the locating hole 23 to hold the shaft 30 in place when the shaft 30 is pushed backwards and received inside the sleeve 20, a front open chamber 35 at its front end, an axial blind hole 351 in the front open chamber 35, a second spring 352 mounted in the axial blind hole 351, a second steel ball 353 supported on the spring 352, and two radial pivot holes 36 aligned at two opposite sides of the front open chamber 35.

The coupling member 40 comprises a circular base 44, an axial open chamber 45 defined within the circular base 44 at one side, an inside annular groove 46 disposed within the circular base 44 around the axial open chamber 45, a flat elongated coupling rod 41 raised from the circular base 44 at an opposite side and inserted into the front open chamber 35 of the shaft 30 with its smoothly curved front end stopped against the second steel ball 353 of the shaft 30, and a pivot hole 42 disposed at the flat elongated coupling rod 41 and connected between the pivot holes 36 on the shaft 30 by a pivot bolt 43 for permitting the coupling member 40 to be turned about the pivot bolt 43 between a first position where the coupling member 40 is axially aligned with the shaft 30, and a second position where the coupling member 40 and the shaft 30 are retained at right angles.

The control device 50 is comprised of a control base 51. and a socket 52. The control base 51 comprises a first circular block 511, a tool stem 512 extended from the center of the first circular block 511 at one side, a second circular block 513 raised from the first circular block 511 at an opposite side and having an outer diameter smaller than the first circular block 511, a radial blind hole 515 at the periphery of the second circular block 513, a spring 516 mounted in the radial blind hole 515, a steel ball 517 supported on the spring 516, a plurality of side recesses 518 equiangularly spaced around the second circular block 513, a circular coupling rod 519 axially raised from the second circular block 513, and an annular groove 5191 around the periphery of the circular coupling rod 519. The socket 52 comprises an inside annular flange 521 raised from its inside wall on the middle, a first axial open chamber 522 and a second axial open chamber 523 separated by the inside annular flange 521, two longitudinal projections 53 raised from the inside annular flange 521, a first recessed portion 54 and a second recessed portion 55 and a third recessed portion 56 respectively disposed at the inside annular flange 521 and separated by the two longitudinal projections 53, the recessed portions 53;54;55 being adapted to receive the steel ball 517 alternatively, a plurality of projecting blocks 57 equiangularly spaced inside the second axial open chamber 523 adjacent to the inside annular flange 521, each projecting block 57 having two curved sides 571 respectively curved inwards, a plurality of needle rollers 58 respectively and axially inserted into the second axial open chamber 523 and supported on the inside annular flange 521 and separated by the projecting blocks 57, and a packing ring 59 mounted within the second axial open chamber 523 to hold the needle rollers 58 in place. When the control base 51 is inserted through the socket 52, the first circular block 511 is stopped at the inside annular flange 521, and the circular coupling rod 519 is inserted into the axial open chamber 45 within the circular base 44 of the coupling member 40 and then secured thereto by a C-shaped clamping ring 60, which is mounted on the annular groove 5191 around the circular coupling rod 519 and partially engaged into the inside annular groove 46 within the circular base 44, permitting the circular base 44 to be retained in the second axial open chamber 523 in the socket 52 and stopped at the packing ring 59 against the inside annular flange 521, and the needle rollers 58 to be respectively received in the side recesses 518 on the second circular block 513 of the control base 51.

Figure 2:
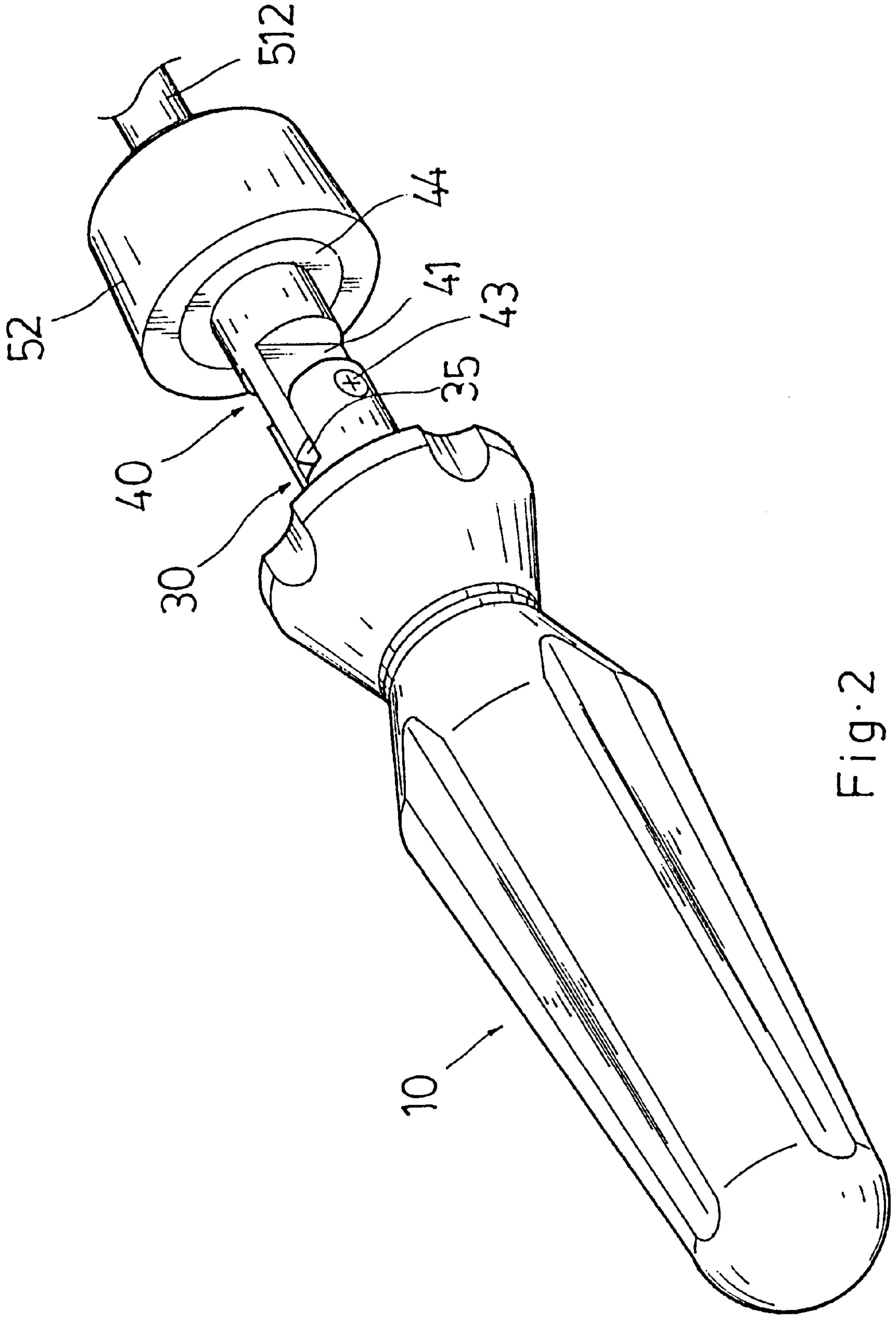
FIG. 2 is a perspective view of the present invention, showing the shaft extended out of the handle, the coupling member and the shaft axially aligned.
Figure 3:
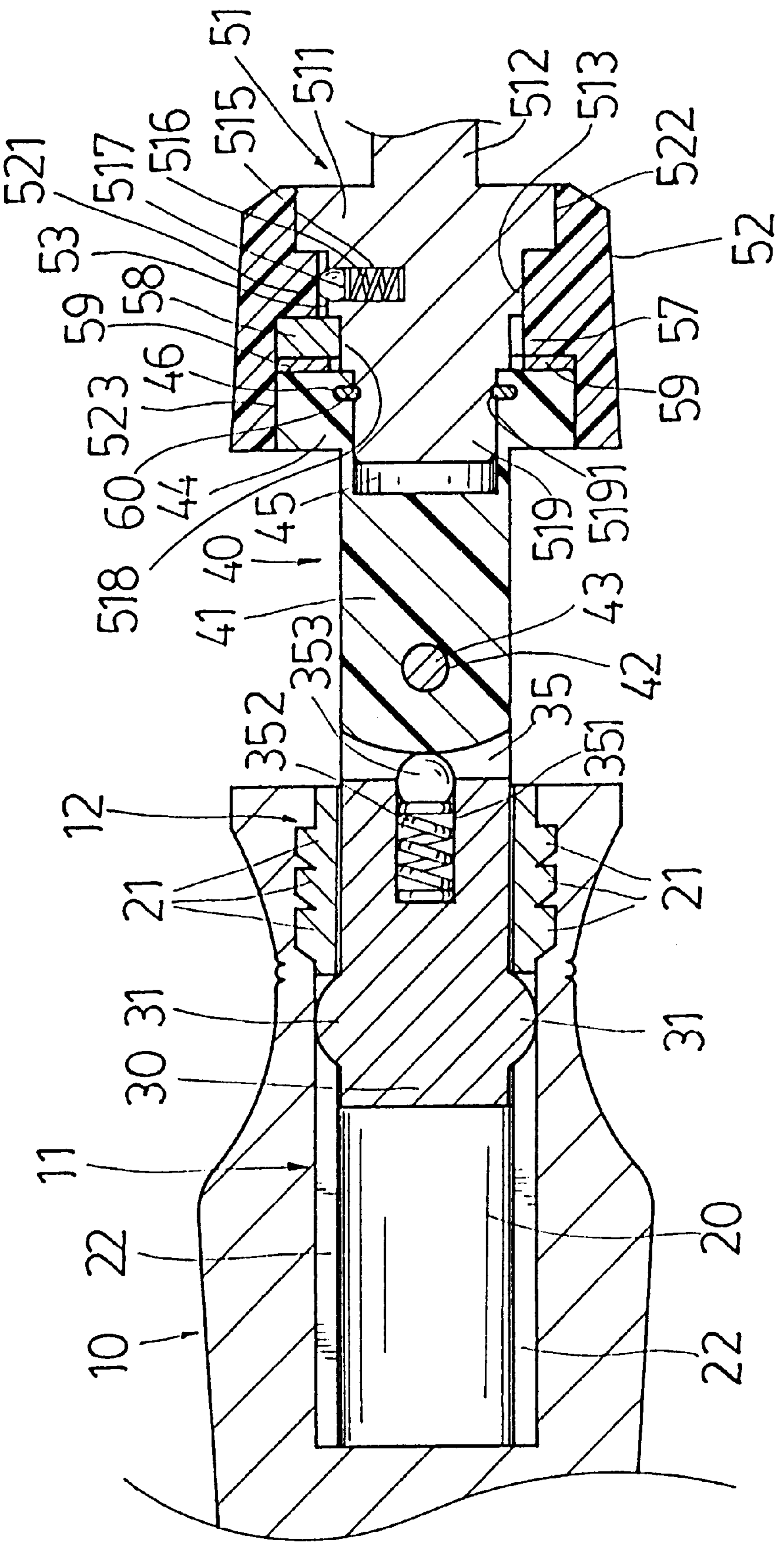
FIG. 3 is a longitudinal view in section of FIG. 2.
Figure 4:
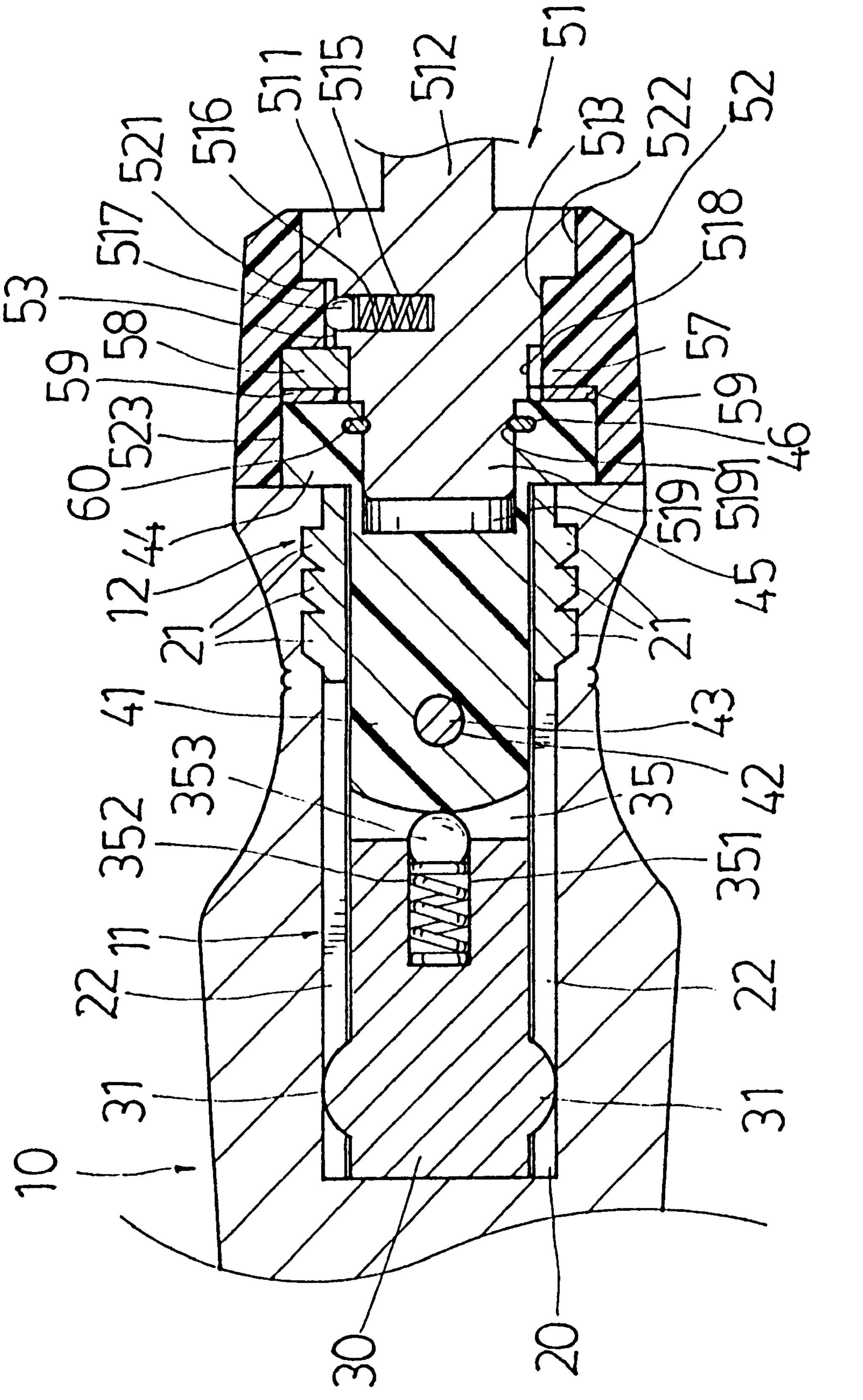
FIG. 4 is a longitudinal view in section of the present invention, showing the shaft received inside the sleeve within the handle.
Figure 5:
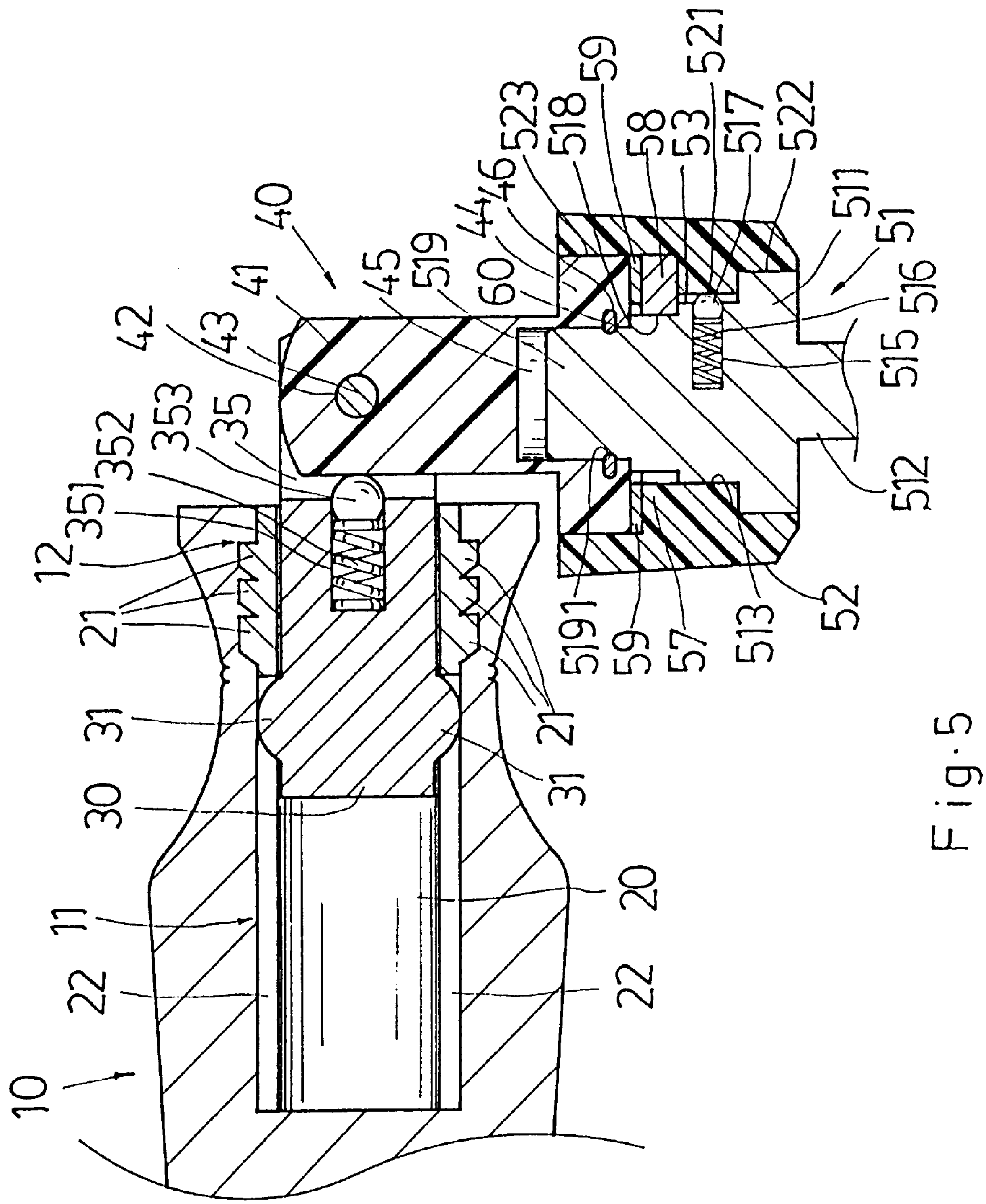
FIG. 5 is another sectional view of the present invention, showing the shaft extended out of the handle, the shaft and the coupling member retained at right angles.

Referring to FIGS. from 2 to 5 again, when the tool stem 512 is pulled outwards, the shaft 30 is pulled out of the sleeve 20, permitting the flat elongated coupling rod 41 of the coupling member 40 and the front open chamber 35 of the shaft 30 to be exposed outside the handle 10 (see FIGS. 2 and 3), and the coupling member 40 can then be turned about the pivot bolt 43 from the first position where the coupling member 40 is axially aligned with the shaft 30 (see FIGS. 2 and 3) to the second position where the coupling member 40 and the shaft 30 are retained at right angles (see FIG. 5). After the coupling member 40 has been turned from the second position to the first position, the coupling member 40 is pushed inwards to force the shaft 30 from the extended position shown in FIG. 3 to the received position shown in FIG. 4. When the shaft 30 is pushed back to the inside of the sleeve 20, the steel ball 34 is forced into engagement with the radial locating hole 23, and therefore the shaft 30 is retained in the received position.

Figure 6:
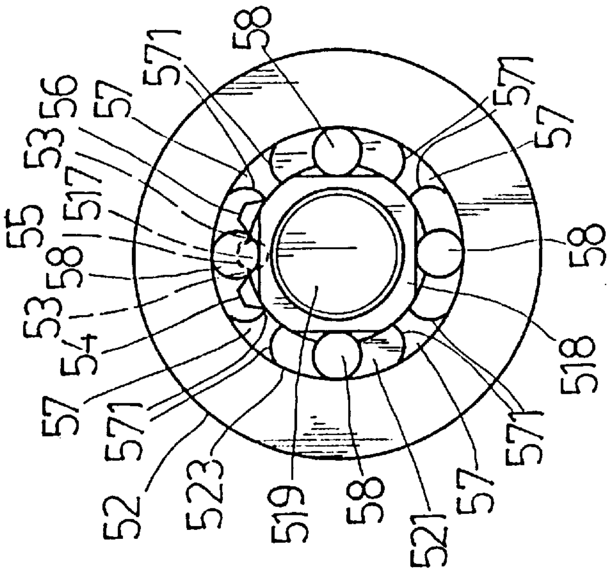
FIG. 6 is a cross sectional view of the control device, showing the steel ball retained in the second recessed portion inside the socket.

Referring to FIG. 6, the socket 52 can be turned relative to the control base 51, permitting the steel ball 517 of the control base 51 to be shifted between the recessed portions 54;55;56 in the socket 52. When the steel ball 517 is retained in the second recessed portion 55, the needle rollers 58 are respectively retained in between each two adjacent projecting blocks 57 and stopped against the inside wall of the socket 52 and prohibited from a rotary motion relative to the socket 52, and thus the tool stem 512 can be turned with the handle 10.

Figure 8:
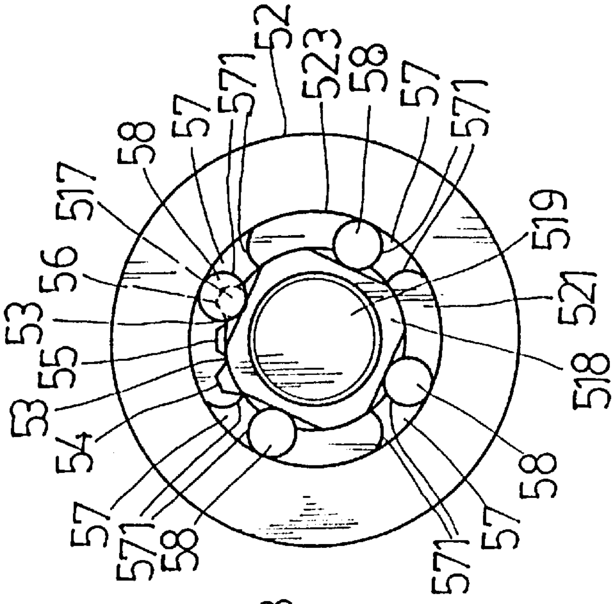
FIG. 8 is another cross sectional view of the control device, showing the steel ball retained in the third recessed portion inside the socket.
Figure 7:
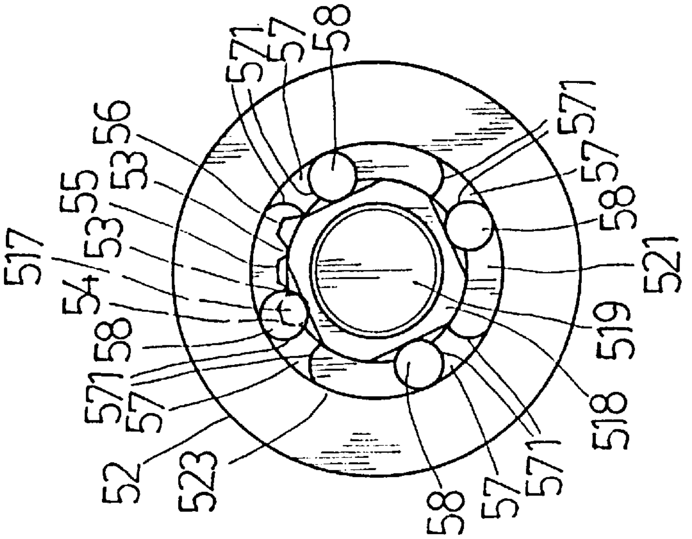
FIG. 7 is another cross sectional view of the control device, showing the steel ball retained in the first recessed portion inside the socket.

Referring to FIGS. 7 and 8, when the steel ball 517 is retained in the first recessed portion 54 or the third recessed portion 56, the needle rollers 58 are respectively moved to one curved side 571 of each projecting block 57 and can be turned in one direction relative to the socket 52. For example, when the steel ball 517 is retained in the first recessed portion 54, the needle rollers 58 are allowed to be turned in one direction relative to the socket 52, and stopped from a reverse rotation by respective corner edges of the side recesses 518, and therefore the tool stem 512 is allowed to be turned with the handle 10 counter-clockwise. Under this mode, the handle 10 runs idle when turned clockwise. On the contrary, when the steel ball 517 is retained in the third recessed portion 56, the tool stem 512 is allowed to be turned with the handle 10 clockwise, and the handle 10 runs idle when turned counter-clockwise.

While only one embodiment of the present invention has been shown and described, it will be understood that various modifications and changes could be made thereunto without departing from the spirit and scope of the invention disclosed.

What the invention claimed is:

1. A hand tool comprising:

a handle, said handle comprising an axial receiving chamber at one end, and a plurality of recessed retaining holes inside said axial receiving chamber;

a sleeve mounted in the axial receiving chamber on said handle, said sleeve comprising a front end, a rear end, a plurality of beveled retainer blocks raised from the periphery near its front end and respectively forced into engagement with the recessed retaining holes inside said handle, at least one longitudinal split extended to its rear end, and a radial locating hole near its rear end;

a shaft inserted into said sleeve and moved between a first position where said shaft is received inside said sleeve and a second position where said shaft is extended out of said sleeve and said handle, said shaft comprising at least one wing respectively raised from the periphery and moved with said shaft along the at least one longitudinal splits on said sleeve, a first spring supported retainer element mounted in a radial blind hole therefore and adapted for engaging into the radial locating hole on said sleeve to hold said shaft in the first position received inside said sleeve, a front open chamber, a second spring supported retainer element mounted in said front open chamber;

a coupling member coupled to said shaft, said coupling member comprising a circular base, an axial open chamber defined within said circular base, a flat elongated coupling rod raised from said circular base and inserted into the front open chamber on said shaft and pivoted thereto by a pivot bolt and retained by the second spring supported retainer element of said shaft between a first position where said coupling member is axially aligned with said shaft, and a second position where said coupling member and said shaft are retained at right angles;

a socket mounted around said circular base of said coupling member, said socket comprising an inside annular flange, a first axial open chamber at one end, a second axial open chamber at an opposite end separated from said first axial open chamber by said inside annular flange which receives the circular base of said coupling member, two longitudinal projections raised from said inside annular flange, a first recessed portion and a second recessed portion and a third recessed portion respectively disposed at said inside annular flange and separated by said two longitudinal projections, a plurality of projecting blocks equiangularly spaced inside said second axial open chamber adjacent to said inside annular flange, each of said projecting blocks having two curved sides respectively curved inwards, a plurality of needle rollers respectively and axially mounted in said second axial open chamber and supported on said inside annular flange and respectively moved between each two adjacent projecting blocks, and a packing ring mounted within said second axial open chamber to hold said needle rollers in place; and a control base coupled to said socket and adapted for transmitting rotary driving power from said handle to a driven member, said control base comprising a first circular block received inside said first axial open chamber within said socket, a tool stem extended from said first circular block at one side, a second circular block raised from said first circular block and inserted through said inside annular flange into said second axial open chamber of said socket, a radial blind hole at the periphery of said second circular block, a steel ball supported on a spring in the radial blind hole on said second circular block and forced into engagement with one of said first recessed portion and said second recessed portion and said third recessed portion inside said socket, a plurality of side recesses equiangularly spaced around said second circular block which receive said needle rollers respectively, a circular coupling rod axially raised from said second circular block and inserted into the axial open chamber of said circular base and secured thereto by a C-shaped clamping ring;

wherein said socket can be turned relative to said control base, permitting the steel ball of said control base to be forced by the respective spring into engagement with one of said first recessed portion and said second recessed portion and said third recessed portion; said needle rollers are respectively retained in between each two adjacent projecting blocks and prohibited from a rotary motion relative to said socket when the steel ball of said control base is retained in said second recessed portion, permitting said tool stem to be turned with the handle clockwise or counter-clockwise; said needle rollers are respectively moved to one curved side of each projecting block for permitting said tool stem to be turned with said handle in one direction only when the steel ball of said control base is retained in said first recessed portion or said third recessed portion.

* * * * *